(12) United States Patent
Hirano et al.

(10) Patent No.: US 9,931,888 B2
(45) Date of Patent: Apr. 3, 2018

(54) WHEEL BEARING APPARATUS

(71) Applicant: NTN Corporation, Osaka-shi (JP)

(72) Inventors: Shinsuke Hirano, Iwata (JP); Makoto Seki, Iwata (JP)

(73) Assignee: NTN Corporation, Osaka-shi (JP)

( * ) Notice: Subject to any disclaimer, the term of this patent is extended or adjusted under 35 U.S.C. 154(b) by 89 days.

(21) Appl. No.: 14/700,675

(22) Filed: Apr. 30, 2015

(65) Prior Publication Data
US 2015/0231921 A1   Aug. 20, 2015

Related U.S. Application Data

(63) Continuation of application No. PCT/JP2013/079571, filed on Oct. 31, 2013.

(30) Foreign Application Priority Data

Nov. 1, 2012   (JP) ................. 2012-241444

(51) Int. Cl.
*B60B 27/00* (2006.01)
*F16C 19/08* (2006.01)

(52) U.S. Cl.
CPC ...... *B60B 27/0005* (2013.01); *B60B 27/0031* (2013.01); *B60B 27/0036* (2013.01); *B60B 27/0084* (2013.01); *B60B 27/0094* (2013.01); *F16C 19/08* (2013.01); *B60B 2380/12* (2013.01); *B60B 2380/73* (2013.01)

(58) Field of Classification Search
CPC ............ B60B 27/0005; B60B 27/0015; B60B 27/0021; B60B 27/0031; B60B 27/0078; B60B 27/0084; B60B 27/0094; B60B 2380/12; B60B 2380/73; B60B 27/0036; F16C 19/02; F16C 19/04; F16C 19/08
USPC ........................................................ 301/110
See application file for complete search history.

(56) References Cited

U.S. PATENT DOCUMENTS 4,460,058 A * 7/1984 Welschof ............ B60B 27/0005
                                                   180/258
4,893,960 A * 1/1990 Beier .................. B60B 27/0005
                                                   403/24

(Continued)

FOREIGN PATENT DOCUMENTS

EP   2 284 021   2/2011
EP   2 441 594   4/2012

(Continued)

Primary Examiner — John D Walters
(74) Attorney, Agent, or Firm — Harness, Dickey & Pierce, P.L.C.

(57) ABSTRACT

A wheel bearing apparatus has a double row rolling bearing detachably united with a constant velocity universal joint. The double row rolling bearing has an outer member, an inner member, and double row rolling elements rollably disposed between the double row raceway surfaces of the outer member and inner member. The constant velocity universal joint has an outer joint member, a shoulder portion, and a shaft portion. A female thread is formed on the shaft portion. End faces of the shoulder portion and the caulked portion are formed with face splines, respectively. The face spline of the caulked portion has a portion where a tooth height of a tooth space of a portion radially outside the pitch circle diameter is set lower than that of other portions of the tooth space.

7 Claims, 5 Drawing Sheets

(56) References Cited

U.S. PATENT DOCUMENTS

| | | | | |
|---|---|---|---|---|
| 7,857,520 B2* | 12/2010 | Langer | ................ | B60B 27/0005 384/544 |
| 8,025,579 B2* | 9/2011 | Kamikawa | .......... | B60B 27/0005 403/97 |
| 8,512,157 B2* | 8/2013 | Harada | ............... | B60B 27/0036 464/178 |
| 2008/0148893 A1 | 6/2008 | Langer et al. | | |

FOREIGN PATENT DOCUMENTS

| | | |
|---|---|---|
| JP | 63-184501 | 7/1988 |
| JP | 07-080590 | 3/1995 |
| JP | 2008-221982 | 9/2008 |
| JP | 2008-536075 | 9/2008 |
| JP | 2009-234541 | 10/2009 |
| JP | 2010-137676 | 6/2010 |
| WO | WO2009/089982 | 7/2009 |
| WO | WO2009/140996 | 11/2009 |

* cited by examiner

WHEEL BEARING APPARATUS

CROSS-REFERENCE TO RELATED APPLICATIONS

This application is a continuation of International Application No. PCT/JP2013/079571, filed Oct. 31, 2013, which claims priority to Japanese Application No. 2012-241444, filed Nov. 1, 2012. The disclosures of the above applications are incorporating herein by reference.

FIELD

The present disclosure relates to a wheel bearing apparatus that supports vehicle wheels and, more particularly, to a wheel bearing apparatus, with a wheel bearing and a constant velocity universal joint, to rotationally support driving wheels (front wheels of FF vehicles, rear wheels of FR or RR vehicles and all wheels of 4WD vehicles) mounted on independent suspensions.

BACKGROUND

The power transmitting apparatus of a vehicle, such as an automobile, is required not only to perform the transmission of engine power of the automobile to the wheels but also to permit radial, axial and moment displacement from the wheels caused during bounds on rough road running or turning of the vehicle. Accordingly, one end of a drive shaft, interposed between an engine side and a driving wheel side, is connected to a differential gear, via a constant velocity universal joint of the sliding type. The other end is connected to driving wheels via a wheel bearing apparatus including a fixed type constant velocity universal joint.

Recently, it is desirable to improve fuel consumption in view of resource savings or anti-pollution. For meeting such a demand, it has been strongly noticed and desired to reduce the weight of automobile parts, especially wheel bearing apparatus. Although various wheel bearing apparatus has been proposed to reduce weight, it is also desirous to reduce the cost of assembly and disassembly of the wheel bearing apparatus at automobile assembling sites or automobile maintenance markets.

A wheel bearing apparatus 50 shown in FIG. 5 is a representative example. A double row rolling bearing 51 and a constant velocity universal joint 52 are detachably connected to each other. The double row rolling bearing 51 includes an outer member 53, an inner member 56, and double row balls 58, 58. The flange 53b has an integrally formed body mounting flange 53b. The flange 53b is mounted on a body of a vehicle. Double row outer raceway surfaces 53a, 53a are formed on the inner circumference of the outer member 53. The inner member 56 includes a wheel hub 54 and an inner ring 55. The wheel hub 54 has, on its one end an integrally formed wheel mounting flange 54 to mount a wheel (not shown). An inner raceway surfaces 54a is arranged opposite to one of the double row outer raceway surfaces 53a, 53a. A cylindrical portion 54c axially extends from the inner raceway surface 54a. The inner ring 55 is press-fit onto the cylindrical portion 54c of the wheel hub 54. The inner ring 55 has an inner raceway surface 55a arranged opposite to the other of the double row outer raceway surfaces 53a, 53a. The double row balls 58, 58 are disposed between the outer and inner raceway surfaces and rollably held by cages 57. The inner ring 55 is axially immovably secured by a caulked portion 59. The caulked portion 59 is formed by plastically deforming the end of the cylindrical portion 54c radially outward. Furthermore, an end face of the caulked portion 59 is formed with a face spline 59a that is formed simultaneously with the formation of the caulked portion 59.

Seals 60, 61 are mounted on annular openings formed between the outer member 53 and the inner member 56. The seals 60, 61 prevent leakage of grease sealed in the bearing and the entry of rain water or dust into the bearing.

The constant velocity universal joint 52 includes an outer joint member 62, joint inner ring 63, a cage 64, and torque transmitting balls 65. The outer joint member 62 has a cup-shaped mouth portion 66, a shoulder portion 67 forming a bottom of the mouth portion 66, and a hollow shaft portion 68. The shaft portion 68 axially extends from the shoulder portion 67. A female thread 68a is formed on an inner circumference of the shaft portion 68. An end face of the shoulder portion 67 is formed with a face spline 67a. This face spline 67a engages the face spline 59a formed on the end face of the caulked portion 59. Thus, the rotational torque from a drive shaft (not shown) can be transmitted to the wheel mounting flange 54b via the constant velocity universal joint 52 and the inner member 56.

A fastening bolt 69 is fastened to the female thread 68a of the shaft portion 68 of the constant velocity universal joint 52. Accordingly, both the opposite face splines 67a, 59a of the outer joint member 62 and the inner member 56 are press-contacted to each other. Thus, the double row rolling bearing 51 and the constant velocity universal joint 52 can be detachably united. This contributes to reduction of weight and size as well as simplification of assembly and disassembly of the wheel bearing assembly (see JP 63-184501 A)

However, in such a prior art wheel bearing apparatus 50, as shown in FIG. 6, the face spline 59a of the caulked portion 59, formed simultaneously with the formation of the caulked portion 59, is processed at a higher caulking degree than the usual caulking degree. Accordingly, it is believed that cracks would be caused in the face spline 59a. Especially the crack generation rate would be increased at a radially outermost tooth bottom of the face spline 59a where the caulking is performed at a highest degree.

In addition, the specifications of the face spline 59a are required to satisfy demands of automobile manufacturers. Thus, it is impossible to largely change the specifications. Accordingly, it is difficult to adopt free designs to suppress the generation of cracks.

SUMMARY

It is therefore an object of the present disclosure to provide a wheel bearing apparatus that prevents the generation of cracks during the spline forming process by a simple way. This improves the durability of the wheel bearing apparatus.

To achieve the object of the present disclosure, a wheel bearing apparatus comprises a double row rolling bearing detachably united with a constant velocity universal joint. The double row rolling bearing comprises an outer member, an inner member and double row rolling elements. A body mounting flange is formed on the outer circumference of the outer member. The body mounting flange is mounted on a body of a vehicle. The outer member includes inner circumference with double row outer raceway surfaces. The inner member includes a wheel hub and at least one inner ring. The wheel hub is integrally formed with a wheel mounting flange on its one end. A cylindrical portion axially extends from the flange. The inner ring is press-fit onto the cylindrical portion of the wheel hub. The inner member includes double row inner raceway surfaces arranged opposite to the double row outer raceway surfaces. The double row rolling elements are rollably disposed between the double row outer raceway surfaces of the outer member and the double row inner raceway surfaces of the inner member. The inner ring is axially immovably secured by a caulked portion, formed by plastically deforming the end of the cylindrical portion radially outward. The constant velocity universal joint has an outer joint member with a cup-shaped mouth portion. A shoulder portion forms a bottom of the mouth portion. A shaft portion axially extends from the shoulder portion. The shaft portion inner circumference includes a female thread. End faces of the shoulder portion of the outer joint member and the caulked portion are formed with face splines, respectively. This joins the double row rolling bearing and the constant velocity universal joint in a torque transmittable manner. The face spline of the caulked portion has a portion where a tooth height of the tooth space of a portion radially outer than the pitch circle diameter is set lower than that of other portions.

According to the wheel bearing apparatus, end faces of the shoulder portion of the outer joint member and the caulked portion are formed with face splines, respectively. This joins the double row rolling bearing and the constant velocity universal joint in a torque transmittable manner. The face spline of the caulked portion has a portion where a tooth height of the tooth space of a portion radially outer than the pitch circle diameter is set lower than that of other portions. Thus, it is possible to provide a wheel bearing apparatus that can insure qualities such as configuration, dimensions etc. on the pitch circle diameter (PCD) of the face spline. This improves the durability of the wheel bearing apparatus while preventing the generation of cracks on the face spline in a simple manner.

The face spline of the caulked portion is formed by a caulking jig, according to a plastic deforming process, simultaneously with the formation of the caulked portion. This reduces the processing steps and accordingly the manufacturing cost.

A breast wall, with a predetermined inclination angle, is formed on the radially outermost position of the tooth space of the face spline.

The inclination angle of the breast wall is set to a range of 10° to 40°. This avoids mutual interference between the face splines and effectively reduces stress generated during the caulking process and, in turn, the generation of cracks.

A breast wall, with a circular arc shape of a predetermined radius of curvature, is formed on the radially outermost position of the tooth space of the face spline.

The radius of curvature of the breast wall is set to a range 2 mm≤R≤10 mm. This avoids mutual interference between the face splines and effectively reduces stress generated during the caulking process and thus the generation of cracks.

The inner member comprises a wheel hub and an inner ring. The wheel hub is integrally formed with an inner raceway surface arranged opposite to one of the double row outer raceway surfaces. A cylindrical portion axially extends from the inner raceway surface. The inner ring is formed with an inner raceway surface arranged opposite to the other of the double row outer raceway surfaces opposite. The wheel hub is formed of medium-high carbon steel including carbon of 0.40 to 0.80% by weight. Its outer circumferential surface is hardened by high frequency induction hardening to have a surface hardness of 58 to 64 HRC. The hardened region is from an inboard-side base of the wheel mounting flange to the cylindrical portion including the inner raceway surface. The caulked portion is maintained as in a non-quenched condition with its surface hardness after forging. This provides the cylindrical portion with sufficient mechanical strength against a rotary bending load applied to the wheel mounting flange. Thus, this improves the anti-fretting property of the cylindrical portion as well as smoothly performing the plastic caulking process without causing the generation of any micro cracks during the caulking process.

The wheel bearing apparatus of the present disclosure comprises an outer member, an inner member and double row rolling elements. The outer member outer circumference includes a body mounting flange mounted on a body of a vehicle. The outer member inner circumference includes double row outer raceway surfaces. The inner member includes a wheel hub and at least one inner ring. The wheel hub is integrally formed with a wheel mounting flange on its one end. A cylindrical portion axially extends from the flange. The inner ring is press-fit onto the cylindrical portion of the wheel hub. The inner member is formed with double row inner raceway surfaces arranged opposite to the double row outer raceway surfaces. The double row rolling elements are rollably disposed between the double row outer raceway surfaces of the outer member and the double row inner raceway surfaces of the inner member. The inner ring is axially immovably secured by a caulked portion formed by plastically deforming the end of the cylindrical portion radially outward. The constant velocity universal joint is integrally formed with an outer joint member, a shoulder, and a shaft portion. The outer joint member includes a cup-shaped mouth portion. The shoulder portion forms a bottom of the mouth portion. The shaft portion axially extends from the shoulder portion. The shaft portion inner circumference includes a female thread. End faces of the shoulder portion of the outer joint member and the caulked portion are formed with face splines, respectively. This joins the double row rolling bearing and the constant velocity universal joint in a torque transmittable manner. The face spline of the caulked portion has a portion where a tooth height of the tooth space of a portion radially outer than the pitch circle diameter is set lower than that of other portions. Thus, it is possible to provide a wheel bearing apparatus that can insure qualities such as configuration, dimensions etc. on the pitch circle diameter (PCD) of the face spline and improve the durability of the wheel bearing apparatus while preventing the generation of cracks on the face spline by a simple way.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

One preferable mode for carrying out the present disclosure is a wheel bearing apparatus with a double row rolling bearing detachably united with a constant velocity universal joint. The double row rolling bearing includes an outer member, inner member and double row rolling elements. The outer member outer circumference includes a body mounting flange mounted on a body of a vehicle. The outer member inner circumference includes double row outer raceway surfaces. The inner member includes a wheel hub and an inner ring. The wheel hub is integrally formed with a wheel mounting flange on its one end. An inner raceway surface, on the wheel hub, is arranged opposite to one of the double row outer raceway surfaces. A cylindrical portion axially extends from the inner raceway surface. The inner ring is press-fit onto the cylindrical portion of the wheel hub. The inner ring includes an inner raceway surface arranged opposite to the other of the double row outer raceway surfaces. The double row rolling elements are rollably disposed between the double row outer raceway surfaces of the outer member and the double row inner raceway surfaces of the inner member. The inner ring is axially immovably secured by a caulked portion. The caulked portion is formed by plastically deforming the end of the cylindrical portion radially outward. The constant velocity universal joint is integrally formed with an outer joint member, a shoulder portion, and shaft portion. The outer joint member includes a cup-shaped mouth portion. The shoulder portion forms a bottom of the mouth portion. The shaft portion axially extends from the shoulder portion. The shaft portion inner circumference includes a female thread. End faces of the shoulder portion of the outer joint member and the caulked portion are formed with face splines, respectively. Both face splines are press-contacted with each other by a fastening bolt fastened to the female-thread of the shaft portion. This joins the double row rolling bearing and the constant velocity universal joint in a torque transmittable and axially detachable manner. The face spline of the caulked portion is formed by a caulking jig, according to a plastic deforming process, simultaneously with the formation of the caulked portion. A breast wall, with a predetermined inclination angle, is formed on the radially outermost position of the tooth space of the face spline. The tooth height of the radially outermost portion is set lower than that of other portions.

Figure 1:
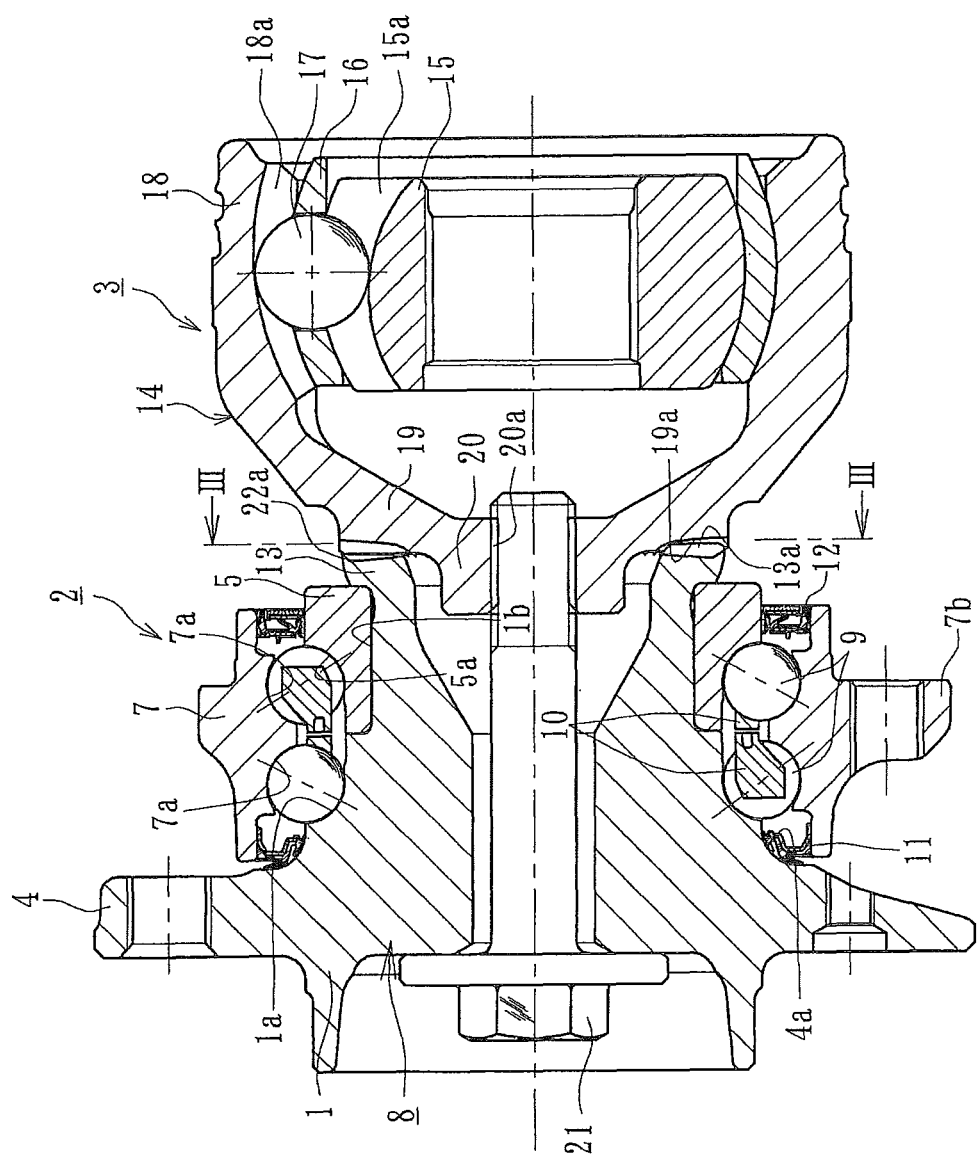
FIG. 1 is a longitudinal section view of a preferred embodiment of a wheel bearing apparatus.
Figure 2:
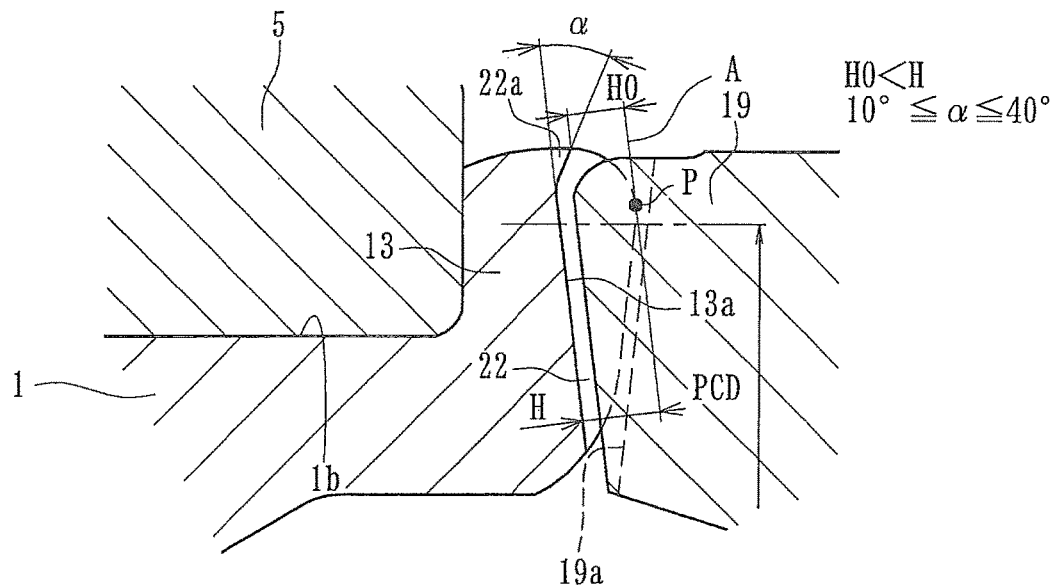
FIG. 2 is a partially enlarged view of a face spline portion of FIG. 1.
Figure 3:
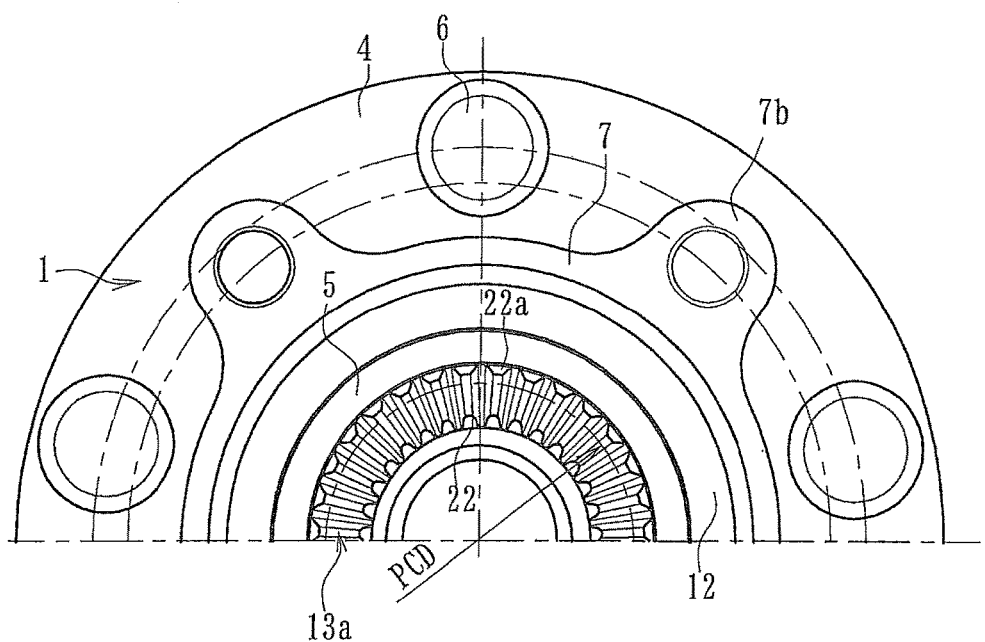
FIG. 3 is an elevation view taken along a line of FIG. 1.
Figure 4:
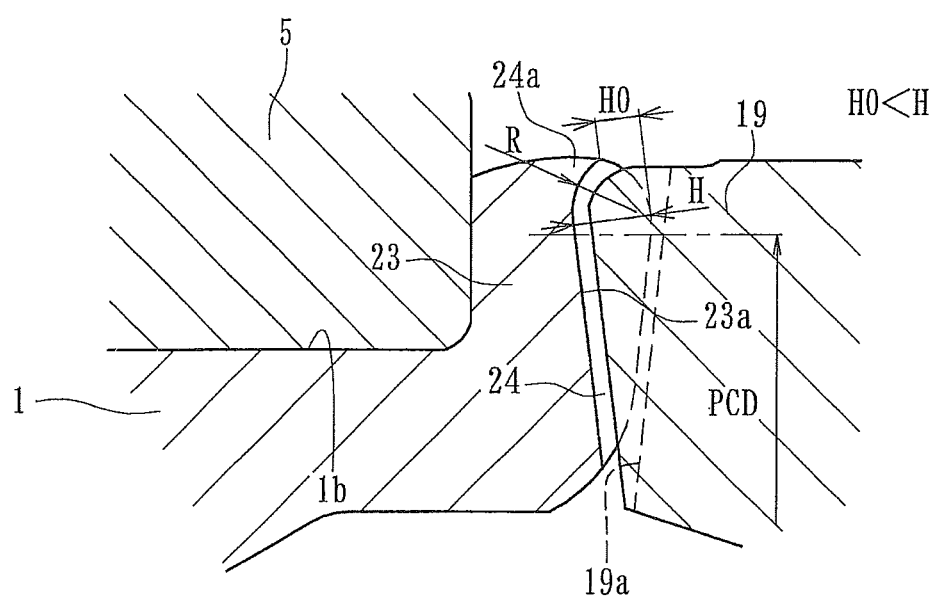
FIG. 4 is a partially enlarged view of a modification of the face spline of FIG. 2.
Figure 5:
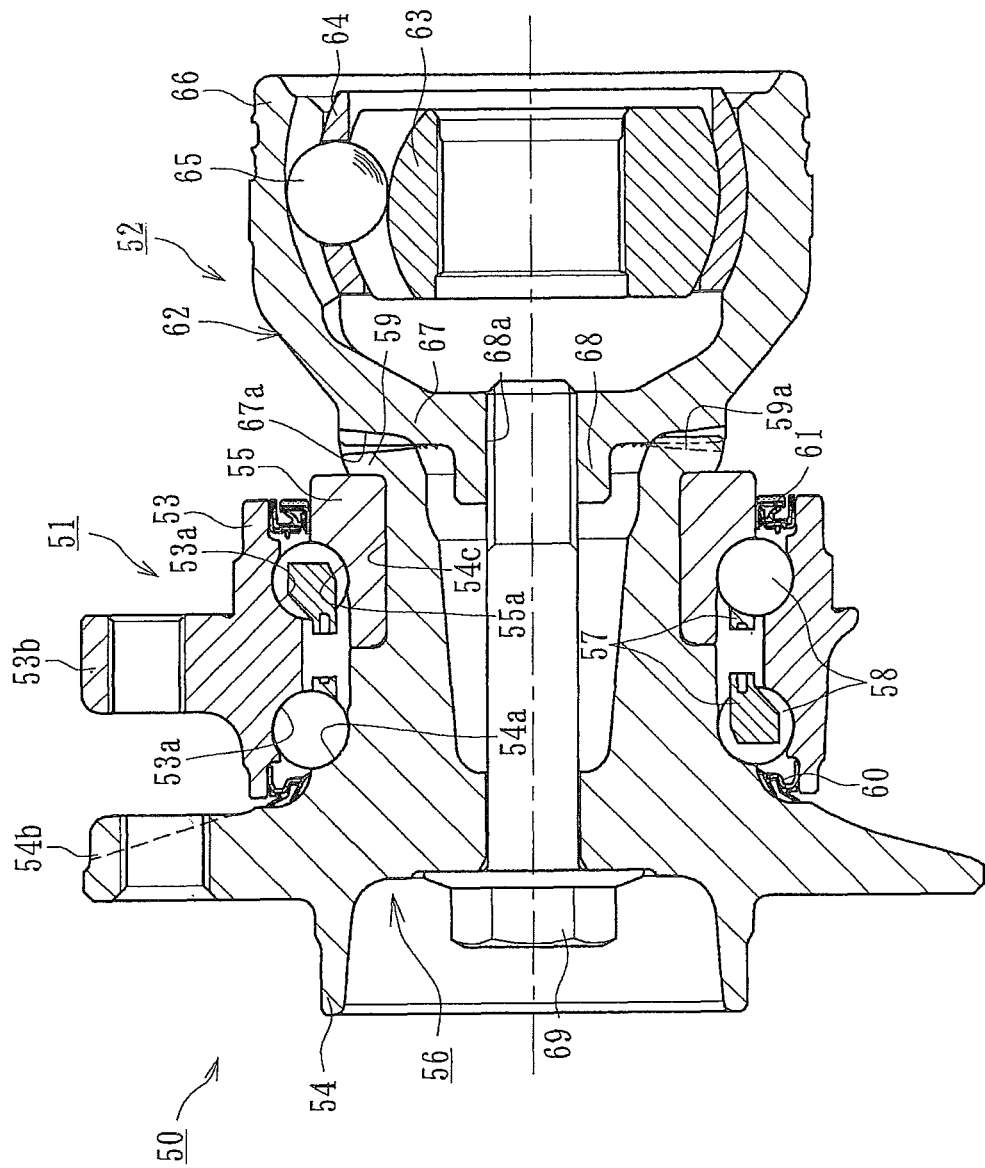
FIG. 5 is a longitudinal section view of a prior art wheel bearing apparatus.
Figure 6:
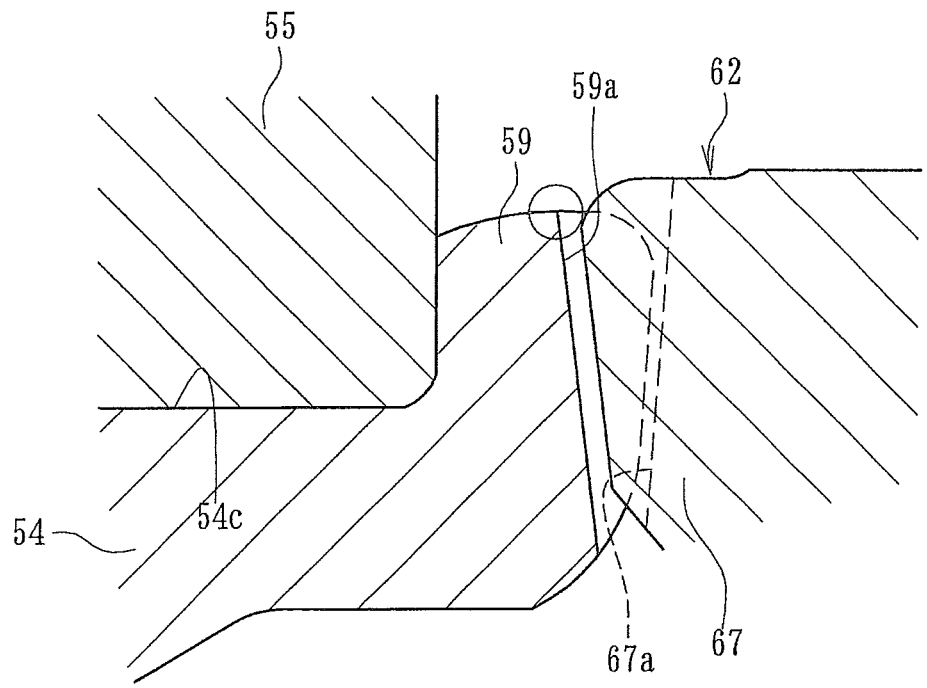
FIG. 6 is a partially enlarged view of a face spline portion of FIG. 5.

FIG. 1 is a longitudinal section view of a preferred embodiment of a wheel bearing apparatus. FIG. 2 is a partially enlarged view of a face spline portion of FIG. 1. FIG. 3 is an elevation view taken along a line III-III of FIG. 1. FIG. 4 is a partially enlarged view of a modification of face spline of FIG. 2. In descriptions of the present embodiment, the term "outboard-side" defines a side that is positioned outside of a vehicle body (the left in FIG. 1). The term "inboard-side" defines a side that is positioned inside of a vehicle body (the right in FIG. 1) when the wheel bearing apparatus is mounted on a vehicle body.

This wheel bearing apparatus is a so-called "third generation" type where a wheel hub 1, a double row rolling bearing 2 and a constant velocity universal joint 3 are detachably united.

The double row rolling bearing 2 includes an outer member 7, an inner member 8 and double row rolling elements (balls) 9, 9. The outer member 7 is formed of medium-high carbon steel such as S53C including carbon of 0.40 to 0.80% by weight. The outer member outer circumference includes an integrally formed body mounting flange 7b. The outer member inner circumference includes double row outer raceway surfaces 7a, 7a. At least the double row outer raceway surfaces 7a, 7a are hardened by high frequency induction hardening to have a surface hardness of 58 to 64 HRC.

The inner member 8 includes a wheel hub 1 and an inner ring 5. The wheel hub 1 is integrally formed with an inner raceway surface 1a arranged opposite to one of the double row outer raceway surfaces 7a, 7a. The inner ring 5 is formed with an inner raceway surface 5a arranged opposite to the other of the double row outer raceway surfaces 7a, 7a. The double row rolling elements 9, 9 are disposed between the double row outer raceway surfaces 7a, 7a of the outer member 7 and the double row inner raceway surfaces 1a, 5a of the inner member 8. The rolling elements 9,9 are rollably held by cages 10, 10.

Seals 11, 12 are mounted in annular openings formed between the outer member 7 and the inner member 8. The seals 11, 12 prevent leakage of grease sealed in the bearing and the entry of rain water or dust into the bearing.

The wheel hub 1 is integrally formed, on its outer-side end, with a wheel mounting flange 4 to mount a wheel (not shown). A cylindrical portion 1b axially extends from the inner raceway surface 1a. The inner ring 5 is disposed on the cylindrical portion 1b. The inner ring 5 is axially immovably secured relative to the wheel hub 1 under a pre-stressed condition by a caulked portion 13. The caulked portion 13 is formed by plastically deforming the end of the cylindrical portion 1b radially outward.

The wheel hub 1 is formed of medium-high carbon steel such as S53C including carbon of 0.40 to 0.80% by weight. It is hardened by high frequency induction hardening to have a surface hardness of 58 to 64 HRC. The hardened region is from an inboard-side base 4a of the wheel mounting flange 4 to the cylindrical portion 1b including the inner raceway surface 1a. The caulked portion 13 is maintained in a non-quenched condition with its surface hardness after forging. This applies sufficient mechanical strength against a rotary bending load applied to the wheel mounting flange 4. Thus, this improves the anti-fretting property of the cylindrical portion 1b when the inner ring 5 is fit onto the cylindrical portion. Also, it improves the plastic deformation process of the caulked portion 13 without causing any cracks.

The inner ring 5 and rolling elements 9 are formed of high carbon chrome steel such as SUJ2. They are dip hardened to their cores to have a hardness of 60 to 64 HRC. Although shown here as a wheel bearing apparatus formed by a double row angular contact ball bearing 2, using balls as the rolling elements 9, the present disclosure is not limited to such a bearing and may include a double row tapered roller bearing using tapered rollers as the rolling elements 9.

The constant velocity universal joint 3 includes an outer joint member 14, joint inner ring 15, a cage 16, and torque transmitting balls 17. The outer joint member 14 includes a cup-shaped mouth portion 18, a shoulder portion 19, forming a bottom of the mouth portion 18, and a hollow shaft portion 20. The shaft portion axially extends from the shoulder portion 19. A female thread 20a is formed on an inner circumference of the shaft portion 20. In addition, curved track grooves 18a, 15a are formed, respectively, on the inner circumference of the mouth portion 18 and on the outer circumference of the joint inner ring 15. The outer joint member 14 is formed of medium-high carbon steel such as S53C including carbon of 0.40 to 0.80% by weight. The track groove 18a is hardened by high frequency induction hardening to have a surface hardness of 58 to 64 HRC.

According to the present embodiment, an end face of the shoulder portion 19 of the outer joint member 14 is formed with a face spline 19a. An end face of the caulked portion 13 is also formed with a face spline 13a. The face spline 13a is formed simultaneously with the formation of the caulked portion 13. The face spline 13a engages the face spline 19a formed on the shoulder portion 19 of the outer joint member 14. This reduces the processing steps and accordingly the manufacturing cost. A fastening bolt 21 is fastened to the female thread 20a of the shaft portion 20 of the constant velocity universal joint 3. Accordingly, both the opposite face splines 19a, 13a of the shoulder portion 19 of the outer joint member 14 and the caulked portion 13 of the wheel hub 1 are press-contacted to each other. Thus, the double row rolling bearing 2 is detachably united with the constant velocity universal joint 3.

As shown in FIGS. 2 and 3, the face spline 13a is formed, by a plastic deforming process using a caulking jig (not shown), simultaneously with the formation of the caulked portion 13. The tooth height HO is radially outside that of its pitch circle diameter (PCD). The tooth height HO of the tooth space 22 is at the radially outermost portion. The tooth height HO is set lower than the tooth height H of other portions (HO<H) of the face spline 13a. "The tooth height H of other portions" means a distance (max. tooth height: H) from a line "A", parallel to the tooth space radially inside the PCD and passing through the tooth top P of the tooth space. More particularly, the tooth height HO (the distance from the line "A" to the tooth space: HO) is reduced by a breast wall 22a. The tooth space 22 radially outside PCD of the face spline 13a is not straight and is inclined at angle α. This provides a wheel bearing apparatus that can insure qualities such as configuration, dimensions etc. on the pitch circle diameter (PCD) of the face spline 13a. This improves the durability of the wheel bearing apparatus while preventing the generation of cracks on the face spline 13a, by a simple way.

The inclination angle α of the breast wall 22a is set in a range of 10° to 40°. It is believed that the breast wall 22a would interfere with its mating face spline 19a if the inclination angle α exceeds 40°. Also, the effects brought by stress reduction during the machining process would be largely decreased if the inclination angle α is less than 10°.

FIG. 4 shows a modification of FIG. 2. Similarly to the previous embodiment, a face spline 23a is formed simultaneously with the formation of the caulked portion 23 by the caulking jig (not shown). The tooth height HO of the radially outermost portion is smaller than the tooth height H of other portions (HO<H). More particularly, the tooth height HO of the radially outermost portion is reduced by providing a circular arc-shaped (not straight-shaped) breast wall 24a on a tooth space 24 radially outside the PCD of the face spline 23a. This insures qualities such as configuration, dimensions etc. on the PCD of the face spline 23a. Also, it prevents the generation of cracks on the face spline 23a in a simple manner. In this case, the radius of curvature R of the breast wall 24a is set in a range 2 mm≤R≤10 mm. It is believed that the breast wall 24a would interfere with its mating face spline 19a if the radius of curvature R of the breast wall 24a is less than 2 mm. The effects brought by stress reduction during the machining process would be largely decreased if the radius of curvature R of the breast wall 24a exceeds 10 mm.

The present disclosure can be applied to wheel bearing apparatus with a double row rolling bearing that includes a wheel hub detachably united with a constant velocity universal joint, via face splines.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents thereof.

What is claimed is:

1. A wheel bearing apparatus has a double row rolling bearing detachably united with a constant velocity universal joint, the double row rolling bearing comprising:
    an outer member including an outer circumference, a body mounting flange on the outer circumference of the outer member, the body mounting flange is to be mounted on a body of a vehicle, the outer member inner circumference includes double row outer raceway surfaces;
    an inner member includes a wheel hub and at least one inner ring, the wheel hub is integrally formed with a wheel mounting flange on its one end, a cylindrical portion axially extends from the wheel mounting flange, the inner ring is press-fit onto the cylindrical portion of the wheel hub, the inner member is formed with double row inner raceway surfaces arranged opposite to the double row outer raceway surfaces;
    double row rolling elements are rollably disposed between the double row outer raceway surfaces of the outer member and the double row inner raceway surfaces of the inner member, the inner ring is axially immovably secured by a caulked portion, the caulked portion is formed by plastically deforming the end of the cylindrical portion radially outward;
    the constant velocity universal joint has an outer joint member including a cup-shaped mouth portion, a shoulder portion, forming a bottom of the mouth portion, a shaft portion axially extends from the shoulder portion, the shaft portion inner circumference includes a female thread;
    end faces of the shoulder portion of the outer joint member and the caulked portion are formed with face splines, respectively, the face splines join the double row rolling bearing and the constant velocity universal joint in a torque transmittable manner;
    the face spline of the caulked portion has a portion with a tooth height (HO) of a tooth space of a portion radially outside a pitch circle diameter (PCD) set lower than other portions of the tooth space and a breast wall is formed on the outermost position of the tooth space of the face spline to reduce the tooth height (HO).

2. The wheel bearing apparatus of claim 1, wherein the face spline of the caulked portion is formed, by a caulking jig according to the plastic deforming process, simultaneously with the formation of the caulked portion.

3. The wheel bearing apparatus of claim 1, wherein the breast wall has with a predetermined inclination angle (α).

4. The wheel bearing apparatus of claim 3, wherein the inclination angle (α) of the breast wall is set in a range of 10 to 40°.

5. The wheel bearing apparatus of claim 1, wherein the breast wall has a circular arc shape of a predetermined radius of curvature (R).

6. The wheel bearing apparatus of claim 5, wherein the radius of curvature (R) of the breast wall is set in a range of 2 mm≤R≤10 mm.

7. The wheel bearing apparatus of claim 1, wherein the inner member comprises a wheel hub and an inner ring, the wheel hub is integrally formed with an inner raceway surface arranged opposite to one of the double row outer raceway surfaces and the cylindrical portion axially extends from the inner raceway surface, the inner ring is formed with an inner raceway surface arranged opposite to the other of the double row outer raceway surfaces; the wheel hub is formed of medium-high carbon steel including carbon of 0.40 to 0.80% by weight, the wheel hub outer circumferential surface is hardened by high frequency induction hardening to have a surface hardness of 58 to 64 HRC, the hardened region is from an inboard-side base of the wheel mounting flange to the cylindrical portion including the inner raceway surface, the caulked portion is maintained in a non-quenched condition with an original surface hardness after forging.

* * * * *

UNITED STATES PATENT AND TRADEMARK OFFICE
CERTIFICATE OF CORRECTION

| | | |
|---|---|---|
| PATENT NO. | : 9,931,888 B2 | Page 1 of 1 |
| APPLICATION NO. | : 14/700675 | |
| DATED | : April 3, 2018 | |
| INVENTOR(S) | : Shinsuke Hirano et al. | |

It is certified that error appears in the above-identified patent and that said Letters Patent is hereby corrected as shown below:

In the Specification

Column 4
Line 65          after "line", insert --III-III--

Signed and Sealed this
Fifth Day of June, 2018

Andrei Iancu
*Director of the United States Patent and Trademark Office*